Aug. 22, 1961  O. A. BECKER ET AL  2,997,000
NUTATING DISK TYPE FLUID OPERATED MOTORS
Filed March 31, 1958  4 Sheets-Sheet 1

INVENTORS
OTTO A. BECKER
GEORGE F. BLAZS
BY
Herschel C. Omohundro
ATTORNEY

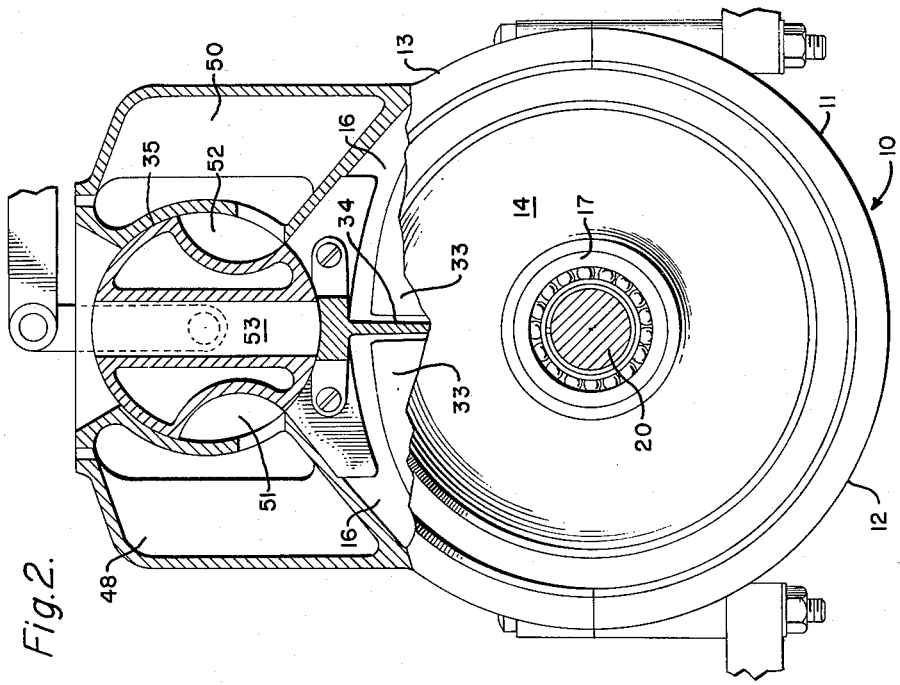
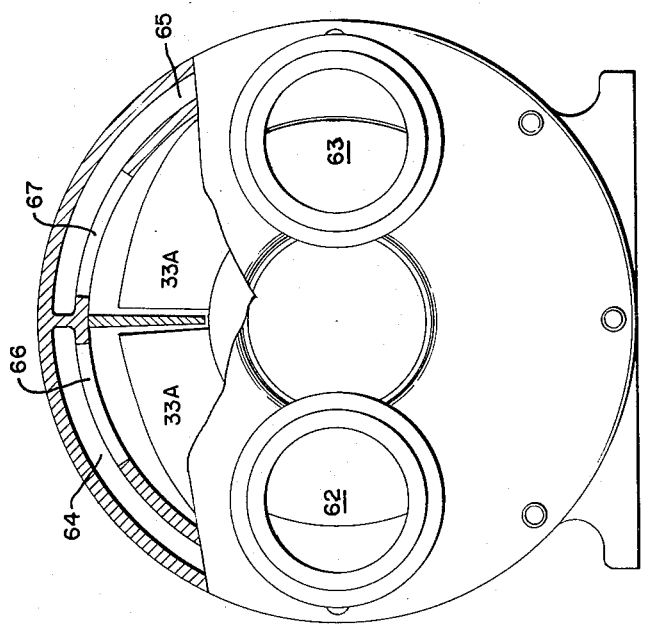

Aug. 22, 1961 O. A. BECKER ET AL 2,997,000
NUTATING DISK TYPE FLUID OPERATED MOTORS
Filed March 31, 1958 4 Sheets-Sheet 3
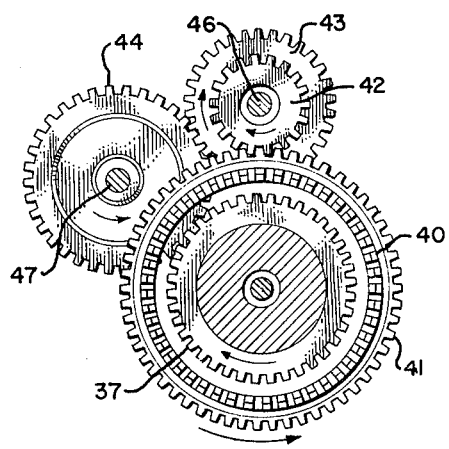
Fig. 3.
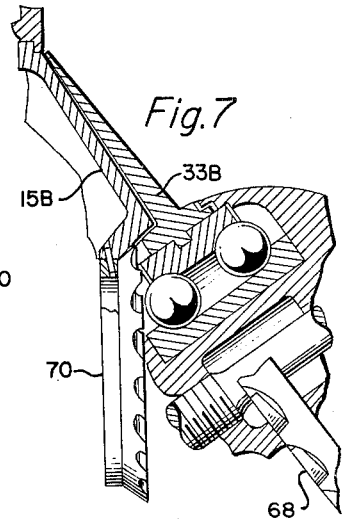
Fig. 7
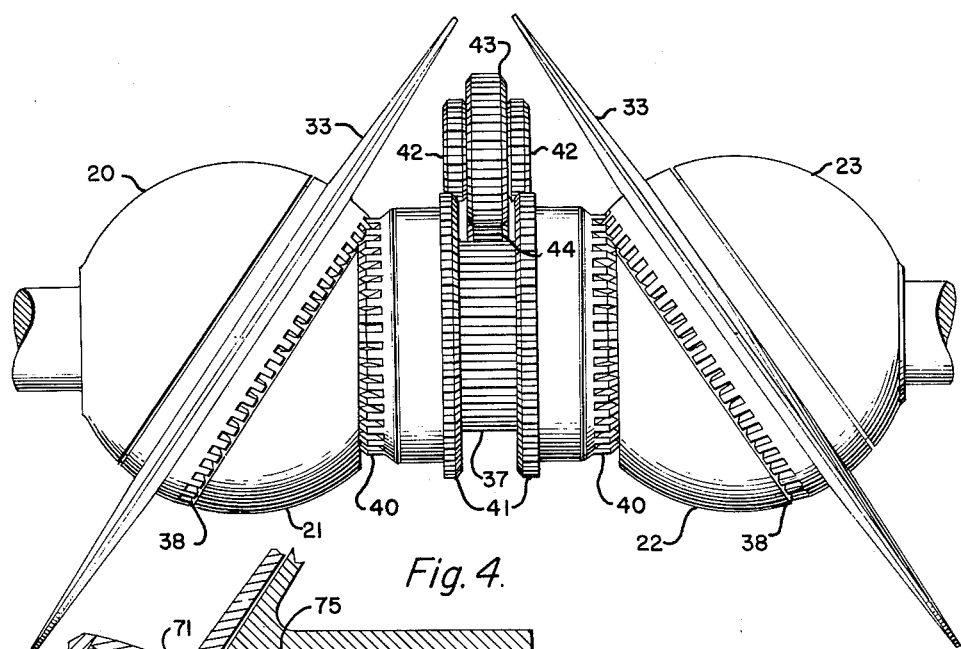
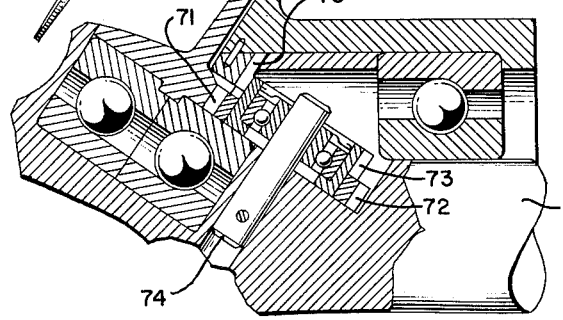
Fig. 4.
Fig. 8
INVENTORS
OTTO A. BECKER
GEORGE F. BLAZS
BY
Herschel C. Omohundro
ATTORNEY Aug. 22, 1961     O. A. BECKER ET AL     2,997,000
NUTATING DISK TYPE FLUID OPERATED MOTORS
Filed March 31, 1958                             4 Sheets-Sheet 4
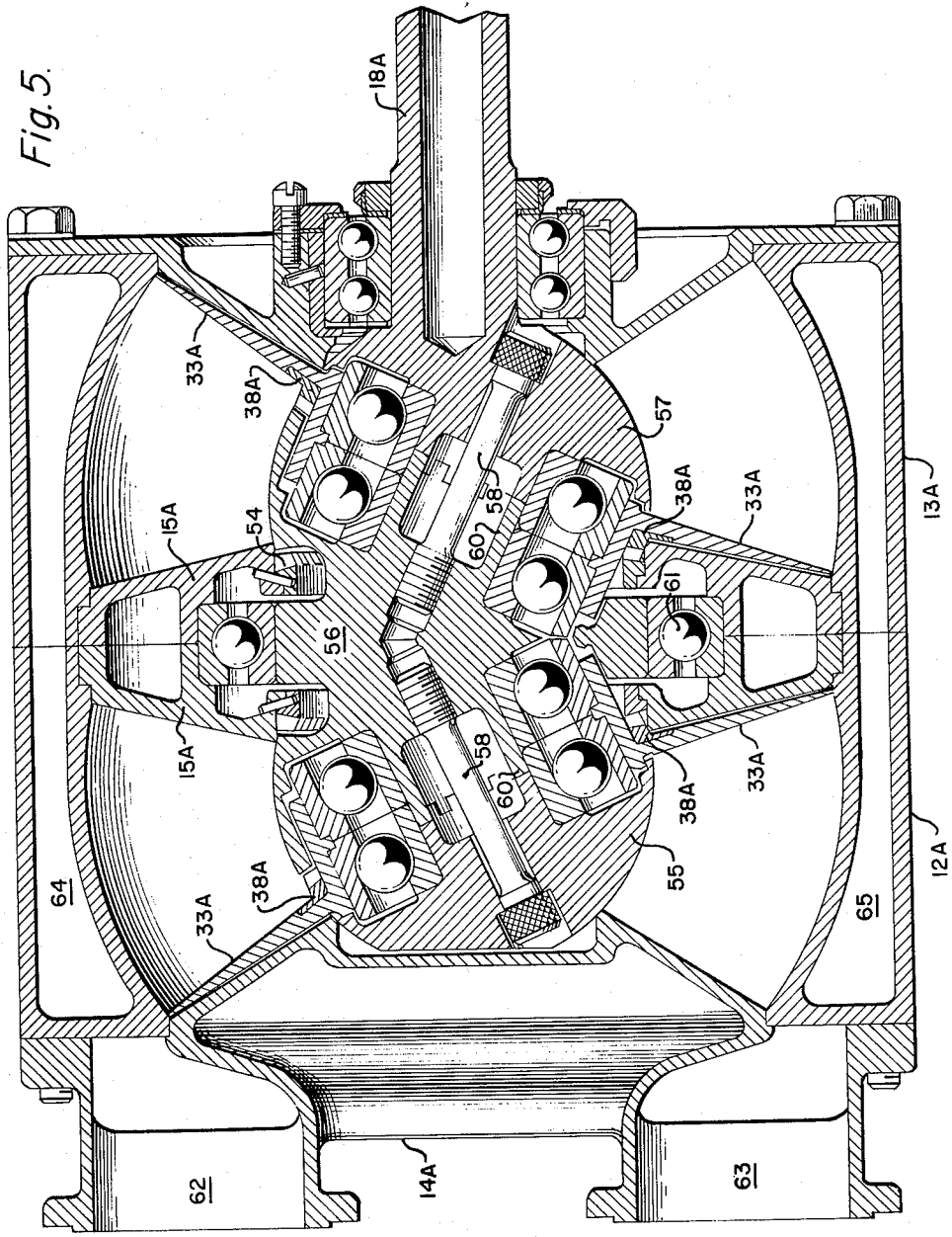
INVENTORS
OTTO A. BECKER
GEORGE F. BLAZS
BY
*Herschel C. Omohundro*
ATTORNEY

United States Patent Office 2,997,000
Patented Aug. 22, 1961

2,997,000
NUTATING DISK TYPE FLUID OPERATED MOTORS
Otto A. Becker and George F. Blazs, Phoenix, Ariz., assignors to The Garrett Corporation, Los Angeles, Calif., a corporation of California
Filed Mar. 31, 1958, Ser. No. 725,268
16 Claims. (Cl. 103—133)

This invention relates generally to fluid pressure energy translating devices, such as pumps and motors, and is more particularly directed to fluid pressure apparatuses of the nutating disk or wobble plate type which are adapted to pump, compress and/or be driven by compressed air or other fluids.

Such pumps and motors are particularly adaptable for use in modern high speed aircraft wherein high temperatures are frequently encountered. These elevated temperatures, which result from jet engine operation, friction, and high ram air temperatures, make the use of electrically and hydraulically operated mechanism impractical, because insulation used in the former tends to deteriorate and fail and the fluids used in the latter break down or vaporize; the provision of special cooling apparatus to prevent such failures is impractical.

Nutating disk type fluid pumps and motors include means forming a chamber in which a disk is supported for nutation. The chamber is provided with fluid inlet and outlet ports separated by a wall extending longitudinally of the chamber, and the disk has a slot through which the wall extends. The basic principle of the nutating disk operation requires some means to restrain the disk from rotation about an axis normal to the plane thereof. In some simple, low speed devices, such as those used in water meters, rotation of the disk is prevented by having the edges of the slot in the disk engage the wall between the inlet and outlet ports. In other devices a bearing fixed to the disk is received for rolling reciprocation in a guide slot formed in the housing.

It has been found, however, that when a nutating disk device is designed for high speed operation and a large angle of nutation, such prior means for preventing rotation of the disk cause it to oscillate about its axis at a frequency of twice the nutating frequency. Corresponding oscillations may also be imparted to the motor housing. These oscillations or the high inertia moments resulting therefrom are objectionable since they cause faulty operation and destruction of the device.

It is an object of this invention, therefore, to provide a high speed nutating disk pump or motor having means for resisting the rotation of the disk or disks about an axis or axes normal to the plane or planes thereof but which will permit the natural nutating action of the disks.

It is also an object of this invention to provide a high speed nutating disk pump or motor having intermeshing gear means on the disk means and other parts of the pump or motor to restrain the disk means from rotary movement about an axis normal to the plane of the disk, the gear means permitting the disk means to nutate in a natural manner with a minimum of resistance.

An object of the invention is to provide a nutating disk pump or motor having intermeshing gear means including a gear fixed to the disk means and another gear fixed to the pump or motor housing, the pitch, ratio, and shape of the gears being such that the disk may nutate freely and still be restrained against rotation about an axis which is normal to the plane of the disk.

A further object of the invention is to provide a nutating disk pump or motor having a gear element on the disk and a second gear element on the housing meshing with the disk gear, the gears having a corresponding number of teeth but different pitch diameters, the gear teeth being shaped or modified to correct or compensate for the difference in pitch diameters and thus restrain the disk against rotation about the axis extending normal to the plane of the disk at the center thereof during the natural nutating movement.

A still further object of the invention is to provide a nutating disk pump or motor having a first gear fixed to the disk and a second gear supported for controlled rotation, such gears being of conventional constructions but of different pitch diameters and having different numbers of teeth, such gears being in meshing engagement, the second gear being driven by a suitable gear train in a direction and at a rate which will restrain the disk against rotation about its own axis.

Another object of the invention is to provide a nutating disk pump or motor having a first gear fixed to the disk and a second gear fixed to part of the pump or motor housing, such gears being of conventional constructions but of different pitch diameters and numbers of teeth, the main shaft of the pump or motor supporting gear means in meshing relation with the first and second gears and operating to compensate for the differences in pitch diameters and numbers of teeth, thus holding the disk against rotary movement in the plane thereof.

Other objects and advantages will be apparent from the following description and the accompanying drawings, in which various forms of the invention have been illustrated. It should be understood that many nutating disk devices may function interchangeably as pumps or compressors and motors, and in the following description and claims the use of any one of the words pump, compressor, or motor is intended to include all of such devices. In the drawings:

FIG. 2 is an end elevational view with parts in vertical section, this view being taken on the planes indicated by the line 2—2 of FIG. 1;

FIG. 3 is an end elevational view of a gear train employed in the motor illustrated in FIG. 1;

FIG. 4 is a side elevational view of an assembly of the shaft, the nutating disks and gear means employed in the motor shown in FIG. 1;

FIG. 5 is a longitudinal sectional view of a motor embodying a modified form of the invention;

FIG. 6 is an end elevational view, with parts in section, of the motor shown in FIG. 5;

FIG. 7 is a fragmentary axial sectional view, with parts in elevation, of a nutating disk motor with a modified form of gearing for restraining the disk against undesired rotary motion; and FIG. 8 is a similar view of another motor with a further modified form of gearing for preventing undesired rotary motion of the disk.

Figure 1:
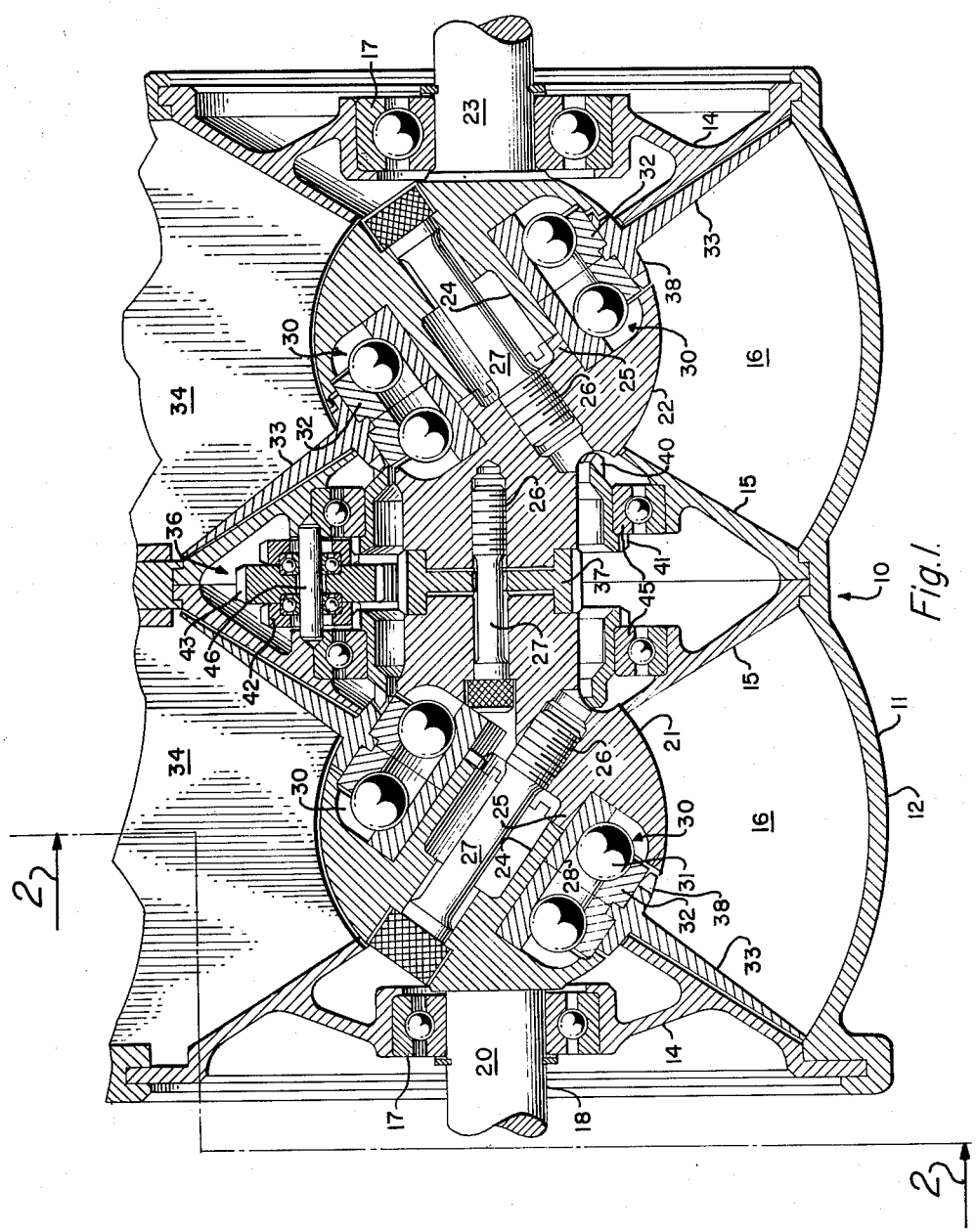
FIGURE 1 is a longitudinal sectional view taken through a fluid motor formed in accordance with the present invention.

Referring more particularly to FIGS. 1 to 4, inclusive, of the drawing, the motor shown therein is designated generally by the numeral 10. This motor includes a casing 11 formed of a plurality of body pieces 12 and 13, and end and partition pieces 14 and 15, respectively, which, when assembled, provide a pair of chambers 16 of partially spherical configuration, the end and partition pieces 14 and 15 providing the chambers with inwardly extending conical end surfaces.

In the form of the invention shown in FIG. 1, the end pieces 14 are provided with antifriction bearings 17 to rotatably support a main shaft 18, this shaft being fabricated from a plurality of pieces 20, 21, 22, and 23, to form a complete unit. These pieces have partially spherical portions which provide sealing surfaces, the pieces also being formed with angular faces from which bosses 24 and 25 project; these bosses have notched end surfaces and when in abutting relationship form bearing receiving shaft sections which extend angularly through the axis of rotation of the main shaft at the centers of generation of the spherical configurations of the chamber walls. The various sections of the shaft are provided with registering openings, certain of which are threaded as at 26, to receive screws 27 employed to retain the shaft pieces in assembled relationship. The bearing receiving sections of the main shaft receive the inner races 28 of antifriction bearings 30, two of the screws 27 serving to clamp these races tightly between the shaft pieces and prevent relative movement thereof. The bearings 30 include ball elements 31, which support for rotary movement the outer race members 32 of the bearing assemblies. These outer race members receive and support disk elements 33 for movement in the chambers 16. The disk elements function in the nature of pistons.

In the operation of the motor, the disk elements move from end to end in the chambers 16 with a rolling action termed a nutating movement. During such movement the sides of the disks, in effect, roll around the end walls of the chambers, opposite sides of the disks being disposed adjacent opposite end walls and at opposite sides of the axis of rotation of the shaft. To effect this movement of the disks, fluid under pressure is supplied to the chambers at one side of a wall 34 extending longitudinally through the chambers. This wall divides the chambers at one side of the shaft into inlet and outlet ends, such ends being selectively supplied with fluid under pressure to effect nutation of the disks, which in turn causes rotation of the shaft in the desired direction.

As shown in FIG. 2, the upper part of the casing is provided with a valve 35, through the manipulation of which fluid may be introduced to selected ends of the chambers and exhausted from the other ends thereof. This valve may also be used to reverse the direction of operation of the motor.

As shown also in FIG. 2, the disks 33 are slotted to straddle the wall 34. In view of this arrangement, the disks must be restrained from rotation about axes normal to the planes thereof. To effect this restraint, the first form of the invention illustrated is provided with a gear train designated generally by the numeral 36, this gear train being disposed within a hollow partition formed between the chambers 16 by the partition pieces 15.

As shown in FIGS. 1 and 3, the gear train 36 includes a shaft gear 37 which is clamped between the shaft sections 21 and 22 to rotate therewith, disk gear sections 38, formed integrally with the disks or otherwise fixed thereto, and intermediate gears 40 to 44, inclusive. Two sets of gears 40 and 41 are provided; each set is formed on a sleevelike element which is supported for rotation in bearings 45 mounted on one of the partition members 15, the teeth of each gear 40 being disposed in meshing engagement with the teeth of the respective disk gear 38. The teeth of each gear 41 mesh with its respective idler gear 42 which is fixed to another idler gear 43, this assembly being supported for rotation on an idler gear shaft 46 suitably supported by the partition members 15. The teeth of gear 43 mesh with another idler gear 44, this gear being supported for rotation on a second idler shaft 47 extending between partition members 15. The teeth of idler gear 44 also mesh with the shaft gear 37, the ratio of the gears and their arrangement being such as to cause gears 40 to revolve in a direction and at a rate which will, in effect, cause gears 38 on the disks to remain in stationary, or non-rotating, relation to axes normal to planes of the disks. It will be noted that the pitch diameters of gears 38 and 40 are different, therefore, gear 40 will be revolved through the rotation of the main shaft, but in a direction to maintain the stationary effect of gears 38. The inclination of the shaft sections which support the disks in angular positions is such as to cause each of the disk gears to mesh with its respective gear 40 at one point only, this point traveling around the axis of the main shaft as the disks nutate in the chambers.

It will be observed from FIG. 2 that the casing section 13 has passages 48 and 50 formed therein to receive fluid pressure from a suitable source, the valve 35 being disposed between these passages and formed with arcuate recesses 51 and 52, which serve in different positions of the valve, to connect one or the other of passages 48 and 50 with selected ends of the chambers 16. When the valve is disposed in position to connect selected ends of the chambers with one or the other passage, a central port 53 in the valve 35 connects the opposite ends of the chambers with the ambient atmosphere. When fluid pressure is supplied to the chambers, this pressure will apply a force first to one side of the disk in the chamber, then to the other side, causing the disk to nutate in the manner previously specified, this movement imparting rotary movement to the main shaft. If it is desired to reverse the direction of rotation of the shaft, valve 35 may be moved to supply the opposite end of the chamber with motive fluid, and the shaft will immediately revolve in the opposite direction.

From the foregoing, it will be apparent that as the shaft revolves, gear 37 will be revolved therewith. This gear will transmit rotary movement through the gear train to the gears 40 with which the disk gears 38 mesh, this engagement serving to restrain the disks against rotation in the planes thereof. In this manner the edges of the slots in the disks will be precluded from engaging the wall 34, and the disks will be prevented from developing undesired inertia moments or imparting them to other parts of the motor.

It will be noted that the peripheries of the disks are disposed in close relationship to the spherical surfaces of the chamber walls. A minimum of clearance is provided at this point to prevent the loss of motive fluid and increase the efficiency of the motor. A certain degree of clearance is provided, however, to decrease or eliminate the necessity for lubrication between the moving parts of the motor. Such clearance also decreases friction between the moving parts, further increasing the efficiency of the device. Since air is utilized as a motive fluid, no danger will result from leakage.

In the second form of the invention, shown in FIGS. 5 and 6, the gear train has been simplified to include ring gears 54 of substantially conventional construction, which are stationarily mounted on the partition pieces 15A. The ring gears are of the same pitch diameter and have the same number of teeth as the disk gears 38A; the necessity for intermediate or idler gears is thus eliminated. The gears 38A and 54 mesh at one point, which travels around the axis of the main shaft as the disks 33A nutate. The disks are thus restrained against rotation in the planes thereof as in the first form of the invention.

In the form of the invention shown in FIGS. 5 and 6, the main shaft has a somewhat different configuration. It is, however, formed of sections 55, 56, and 57 which are fastened together by suitable screws 58 and form angularly directed bearing receiving portions 60 which extend through the axis of rotation of the shaft at the points of generation of the spherical chamber walls.

It will be noted from FIG. 5 that the shaft 18A has the central section 56 thereof supported by an antifriction bearing 61 clamped between the partition sections 15A. With this construction, one end only of the shaft 18A extends through the casing wall. This end of the shaft is supported in a bearing, but such bearing is provided to carry external loads rather than forces developed within the motor which are supported entirely by bearing 61. The end wall 14A of the casing closes the end of the adjacent chamber; it has inlet and outlet ports 62 and 63 provided therein, these ports communicating with passages 64 and 65 formed in the casing and communicating with opposite ends of the chambers through ports 66 and 67, respectively, as shown in FIG. 6. With this form of the invention, a reversing valve, not shown, will have its appropriate ports connected by suitable conduits with the ports 62 and 63.

The operation of the second form of the invention is substantially identical with the operation of the form first described, the primary difference between the forms of the invention residing in the different arrangement of gearing employed to prevent rotary movement of the disks about the axes of the shaft sections on which they are mounted. It will be noted from FIG. 5 that the disks 33A are not truly planar, but have a conical configuration conforming substantially to that of the partition section 15A. This arrangement facilitates the assembly of the motor and permits the use of gearing having a substantially conventional configuration. It also permits the elimination of some of the gears in the gear train utilized in the first form of the invention. The angle through which the disks nutate in this form of the invention, however, must of necessity be limited.

It will be noted from FIG. 5 that the walls at opposite ends of the chambers are inclined at different degrees, the end walls formed by the partitions 15A being inclined to a lesser degree than the outer end walls. This arrangement disposes the centers of generation of the spherical walls in closer proximity to the inner ends of the chambers. Through this arrangement, the casing may be formed of two sections, 12A and 13A, which abut one another in a plane normal to the axis of rotation of the main shaft. The disks may thus be inserted through the inner ends of the casing sections. The axial separation of the casing sections used in the first form of the invention is thus eliminated.

Other gearing arrangements may be provided to permit nutation of the disks without allowing rotation thereof about axes normal to the planes of the disks. For example, the disk and adjacent end wall of the chamber may be provided, as illustrated in FIG. 7, with meshing gears 68 and 70. Gear 68 is fixed to disk 33B and gear 70 is fixed to partition 15B. These gears have the same number of teeth but their pitch diameters are different, the larger gear 68 being mounted on the disk. Since the gears have the same number of teeth, the shapes of the teeth must be corrected or modified to compensate for the difference in spacing between the teeth.

Another example of disk restraining gearing is shown in FIG. 8. In this modification, the disk gear 71 meshes with one of a pair of connected gears 72 and 73 supported for rotation on a pivot 74 carried by shaft 18B. The other gear 73 of the pair meshes with a fourth gear 75 fixed within the casing of the pump. It will be noted that gears 72 and 73 are of different pitch diameters to compensate for a difference in pitch diameters of the gears fixed to the disk and casing. The ratios of the gears are calculated to restrain the disk against rotation about the axis of the shaft section on which it is supported. This arrangement permits a true nutating action of the disk and the avoidance of objectionable inertia forces.

It will be noted that in all forms of the fluid motors illustrated two piston chambers are provided and the angular shaft sections are inclined in opposite directions. This construction has been selected to balance the forces resulting from inertia and gases applied to the disks. When two disks arranged 180 degrees out of phase are used, no axial forces are transmitted to the main shaft bearings.

We claim:

1. Fluid pressure apparatus comprising: a casing forming a chamber of segmental spherical configuration; shaft means supported for rotation in said casing, said shaft means having a portion extending angularly through the axis of rotation of said shaft means at the center of generation of the sperical form of said chamber; smooth surfaced disk means journalled on said angular portion of said shaft; a full circle gear means on said disk means adjacent the mounting for said disk on said shaft; and gear means in said casing in meshing relationship with the gear means on said disk means, said gear means restraining said disk means against rotation about the axis of the angular portion of said shaft means.

2. Fluid pressure apparatus comprising: a casing forming a plurality of chambers of segmental spherical configuration separated by a hollow partition; shaft means supported for rotation in said casing, said shaft means having a portion in each chamber extending angularly through the axis of rotation of said shaft means at the center of generation of the spherical form of the chamber; smooth surfaced disk means journalled on each of said angular portions of said shaft means; and intermeshing gear means on said disk means adjacent the mounting therefor on said shaft and in said hollow partition to restrain said disk means against rotation about the axes of the angular portions of said shaft means.

3. Fluid pressure apparatus comprising: a casing forming a chamber of segmental spherical configuration; shaft means supported for rotation in said casing, said shaft means having a portion extending angularly through the axis of rotation of said shaft means at the center of generation of the spherical form of said chamber; smooth surfaced disk means journalled on the angular portion of said shaft; and an intermeshing gear train connecting said disk and shaft means, said gear train being operative to restrain the disk against rotation about an axis extending through the center of the disk normal to the plane thereof.

4. Fluid pressure apparatus comprising: a casing forming a chamber of segmental spherical configuration; shaft means supported for rotation in said casing, said shaft means having a portion extending angularly through the axis of rotation of said shaft means at the center of generation of the spherical form of said chamber; smooth surfaced disk means journalled on the angular portion of said shaft; a gear train connecting said disk and shaft means, said gear train having a gear fixed to said shaft means; a gear fixed to said disk means; and intermediate gears meshing with said shaft and disk gears and operating to restrain said disk means against rotation about an axis extending through the center of the disk normal to the plane thereof, nutation of said disk means in said chamber causing the rotation of said shaft means.

5. Fluid pressure apparatus comprising: a casing forming a chamber of segmental spherical configuration; shaft means supported for rotation in said casing, said shaft means having a portion extending angularly through the axis of rotation of said shaft means at the center of generation of the spherical form of said chamber; smooth surfaced disk means journalled on the angular portion of said shaft; a first gear means fixed to said casing; and a second gear means fixed to said disk means adjacent to the mounting therefor on said shaft, said second gear means meshing with said first gear means, the ratio of said first and second gear means being such that the interengaging gears restrain said disk means against rotation about an axis extending normal to the plane of the disk through the center thereof.

6. A fluid pressure operated motor comprising: a casing forming chambers of partially spherical configuration separated by a partition: shaft means supported for rotation in said casing, said shaft means having a portion in each chamber extending angularly through the axis of rotation of said shaft means at the center of generation of the sperical form of the respective chamber; a smooth surfaced disk means journalled on each angular portion of said shaft means; gear means on each of said disk means adjacent the mounting therefor on said disk means; and complemental gear means on said partition in meshing relation with said disk supported gear means, said meshing gear means serving to restrain said disk means against rotation about axes extending normal to the planes of the disks through the centers thereof, nutating movement of said disks causing said shaft means to rotate in said casing.

7. In a fluid pressure operated motor, the combination comprising: a casing forming chambers of partially spherical configuration separated by a partition; shaft means supported for rotation in said casing, said shaft means having a portion in each chamber extending at an angle through the axis of rotation of said shaft means at the center of generation of the spherical form of the respective chamber, said shaft portions being inclined in opposite directions; a smooth surfaced disk element journalled on the angular shaft portion in each chamber, rotation of said shaft causing a rolling oscillatory motion of each disk element in its respective chamber; gear means provided on said disk elements adjacent the mounting therefor on said shaft shaft; and additional gear means supported by said partition in meshing engagement with the gear means on said disk elements to restrain the latter against rotation about axes extending normal to the planes thereof at their centers.

8. In a fluid pressure operated motor, the combination comprising: a casing forming a chamber of partially spherical configuration; a shaft supported for rotary movement in said casing, said shaft having a portion in said chamber extending angularly through the axis of rotation of said shaft at the center of generation of the spherical form of the chamber; a first gear element supported in said casing at one side of said chamber; a smooth surfaced disk member journalled on the angular portion of said shaft; and a second gear element fixed relative to said disk member adjacent the mounting therefor on said shaft, the inclination of the angular portion of said shaft serving to hold said second gear in mesh with said first gear at one point, rotation of said shaft causing the point of engagement of said gears to move around said first gear and restrain said disk against rotation about an axis extending normal to said disk at the center thereof while nutating in said chamber.

9. In a fluid pressure operated motor, the combination comprising: a casing forming a chamber of partially spherical configuration with conical end walls, the inclination of the wall at one end being different than that of the wall at the opposite end; a shaft supported for rotary movement in said casing, said shaft having a portion in said chamber extending angularly through the axis of rotation of the shaft at the center of generation of the spherical form of the chamber; a first gear element supported in said casing at the chamber end wall with the slightest inclination; a smooth surfaced disk member journalled on the angular portion of said shaft; and a second gear element fixed relative to said disk member adjacent the mounting therefor on said shaft, the inclination of the angular portion of said shaft serving to hold said second gear in mesh with said first gear at one point, rotation of said shaft causing the point of engagement of said gears to travel around said first gear while restraining said disk against rotation about an axis extending normal to the disk at the center thereof.

10. In a fluid pressure operated motor, the combination comprising: a casing forming a chamber of partially spherical configuration with a conical wall at one end; a shaft supported for rotary movement in said casing, said shaft having a portion in said chamber extending angularly through the axis of rotation of the shaft at the center of generation of the spherical form of the chamber; a first gear element supported in said casing at the end opposite that having the conical end wall; a smooth surfaced disk member journalled on the angular portion of said shaft; and a second gear fixed relative to said disk member adjacent the mounting therefor on said shaft, the inclination of the angular portion of said shaft serving to hold said second gear in mesh with said first gear at one point, rotation of said shaft causing the point of engagement of said gears to travel around said first gear while restraining said disk against rotation about an axis extending normal to the disk at the center thereof.

11. In a fluid pressure operated motor, the combination comprising: a casing forming chamber sections of partially spherical configuration; shaft means supported for rotation in said casing, said shaft means having a portion in each chamber section extending at an angle through the axis of rotation of said shaft means at the center of generation of the spherical form of the chamber, said shaft portions being inclined in opposite directions; a smooth surfaced disk element journalled on the angular shaft portion in each chamber section, nutating movement of said disk elements imparting rotary movement to said shaft means; a fully circular gear means carried by each of said disk elements adjacent the mounting therefor on said shaft; and complemental gear means carried by said casing and meshing with the gear means on said disk elements to restrain the latter against rotation about axes extending normal to the planes of said disk elements at the centers thereof.

12. Fluid pressure apparatus comprising: a casing forming a chamber of segmental spherical configuration; shaft means supported for rotation in said casing, said shaft means having a portion extending angularly through the axis of rotation of said shaft means at the center of generation of the spherical form of said chamber; partition means extending across said chamber in a plane containing the axis of rotation of said shaft means, said partition means forming inlet and outlet ends for said chamber; smooth surfaced disk means journalled on said angular portion of said shaft, said disk means being slotted to receive said partition means; a fully circular gear means on said disk means between the inner end of said slot and the journal for said disk means; and gear means in said casing in meshing relationship with the gear means on said disk means, said gear means serving to restrain said disk means against rotation about the axis of the angular portion of said shaft means.

13. Fluid pressure apparatus comprising: a casing forming a chamber of segmental spherical configuration; shaft means supported for rotation in said casing, said shaft means having a partially spherical portion disposed concentrically in the spherical chamber; a partition extending across said chamber in parallel relation to the axis of said shaft, said partition terminating in closely spaced relation to the spherical portion of said shaft; smooth surfaced disk means journalled on said shaft about an axis extending angularly through the axis of rotation of the shaft at the center of generation of the spherical form of said chamber; gear means on said disk within the boundary of the spherical portion of said shaft means; and gear means in said casing in meshing relationship with the gear means on said disk means, said gear means serving to restrain said disk means against rotation about the axis on which said disk means is journalled.

14. Fluid pressure apparatus comprising: casing means forming a pair of chambers of partially spherical configuration separated by a first partition with conical sides projecting into the chambers; shaft means supported for rotation in said casing, said shaft means having a portion in each chamber extending angularly through the axis of rotation of said shaft at the center of generation of the spherical form of the respective chamber; a second partition means extending across said chambers in a plane containing the axis of rotation of said shaft means, said second partition means forming inlet and outlet ends for said chambers; smooth surfaced disk means journalled on said angular portions of said shaft means, said disk means being slotted to receive said second partition means; a fully circular gear means on each disk means between the inner end of the slot therein and the journalled mounting for said disk means; and gear means mounted in said casing within the confines of said first partition, the latter gear means and the gear means on said disk means being disposed in meshing relationship and serving to restrain said disk means against rotation about the axes of the angular portions of said shaft means.

15. Fluid pressure apparatus comprising: casing means forming a pair of chambers of partially spherical configuration separated by a first partition with conical sides projecting into the chambers; shaft means supported for rotation in said casing, said shaft means having a portion in each chamber extending angularly through the axis of rotation of said shaft at the center of generation of the spherical form of the respective chamber; a second partition means extending across said chambers in a plane containing the axis of rotation of said shaft means, said second partition means forming inlet and outlet ends for said chambers; smooth surfaced disk means journalled on said angular portions of said shaft means, said disk means being slotted to receive said second partition means; a fully circular gear means on each disk means between the inner end of the slot therein and the journalled mounting for said disk means; and a gear-type transmission disposed within the confines of said first partition, said transmission forming a motion transmitting relation between said shaft means and said disk means and serving to restrain the latter against rotation about the angular portions of said shaft means.

16. Fuild pressure apparatus comprising: casing means forming a pair of chambers of partially spherical configuration separated by a first partition with conical sides projecting into the chambers; shaft means supported for rotation in said casing, said shaft means having a portion in each chamber extending angularly through the axis of rotation of said shaft at the center of generation of the spherical form of the respective chamber; a second partition means extending across said chambers in a plane containing the axis of rotation of said shaft means, said second partition means forming inlet and outlet ends for said chambers; smooth surfaced disk means journalled on said angular portions of said shaft means, said disk means being slotted to receive said second partition means; a fully circular gear means on each disk means between the inner end of the slot therein and the journalled mounting for said disk means; a second gear means on said shaft means; and intermediate gear means supported in said casing within the confines of said first partition, said intermediate gear means meshing with the gear means on said disk and shaft means and serving to restrain said disk means aganist rotation about the angular portions of said shaft means.

References Cited in the file of this patent

UNITED STATES PATENTS

| 1,323,907 | Pennick | Dec.. 2, 1919 |
| 1,783,707 | Gamon | Dec. 2, 1930 |
| 2,015,826 | Vincent | Oct. 1, 1935 |

FOREIGN PATENTS

| 7,516 | Great Britain | of 1910 |
| 7,688 | Great Britain | of 1838 |
| 99,176 | Austria | Feb. 10, 1925 |
| 890,116 | Germany | Sept. 17, 1953 |